US011985267B2

(12) United States Patent
Kanao

(10) Patent No.: US 11,985,267 B2
(45) Date of Patent: May 14, 2024

(54) ELECTRONIC DEVICE LINKING SYSTEM, CONTROL DEVICE, AND METHOD

(71) Applicant: Panasonic Intellectual Property Management Co., Ltd., Osaka (JP)

(72) Inventor: Hirohiko Kanao, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 270 days.

(21) Appl. No.: 17/576,515

(22) Filed: Jan. 14, 2022

(65) Prior Publication Data

US 2022/0311858 A1 Sep. 29, 2022

(30) Foreign Application Priority Data

Mar. 26, 2021 (JP) ................. 2021-054329

(51) Int. Cl.
*H04M 1/72412* (2021.01)
*H02J 7/00* (2006.01)
*H02J 50/80* (2016.01)
*H02J 50/90* (2016.01)
*H04M 1/72448* (2021.01)
(Continued)

(52) U.S. Cl.
CPC ....... *H04M 1/72412* (2021.01); *H02J 7/0049* (2020.01); *H02J 50/80* (2016.02); *H02J 50/90* (2016.02); *H04M 1/72448* (2021.01); *H04W 8/22* (2013.01); *H02J 50/10* (2016.02)

(58) Field of Classification Search
CPC ........... H04M 1/72412; H04M 1/72448; H02J 50/80; H02J 50/90; H02J 7/0049; H02J 50/10; H04W 8/22
See application file for complete search history.

(56) References Cited

U.S. PATENT DOCUMENTS 9,875,649 B2 * 1/2018 King .................. G08C 17/02
2011/0306338 A1 12/2011 Ozaki et al.
2012/0322382 A1 12/2012 Toyoda
(Continued)

FOREIGN PATENT DOCUMENTS

CN 102342174 A 2/2012
CN 102771031 A 11/2012
(Continued)

OTHER PUBLICATIONS

Chinese Office Action dated Jan. 30, 2024, for the corresponding Chinese Patent Application No. 202210127486.X, 18 pages. (With English Translation).

*Primary Examiner* — Adam D Houston
(74) *Attorney, Agent, or Firm* — Seed IP Law Group LLP

(57) ABSTRACT

An electronic device linking system includes one or more electronic devices, a control device that controls the electronic device, and a wireless charger that charges the mobile terminal device. The wireless charger includes a first hardware processor that receives terminal information of the mobile terminal device by wireless communication with the mobile terminal device, and transmits, to the control device, the terminal information of the mobile terminal device received through the wireless communication. The control device includes a second hardware processor that links the mobile terminal device and the electronic device with each other on the basis of the terminal information received from the wireless charger.

15 Claims, 19 Drawing Sheets

(51) Int. Cl.
*H04W 8/22* (2009.01)
*H02J 50/10* (2016.01)

(56) References Cited

U.S. PATENT DOCUMENTS

| | | | |
|---|---|---|---|
| 2014/0114504 A1 | 4/2014 | Yamashita et al. | |
| 2014/0176301 A1* | 6/2014 | Fernandez Banares | G07C 9/21 340/5.61 |
| 2015/0061828 A1* | 3/2015 | Fischer | G07C 9/20 340/5.61 |
| 2017/0164179 A1* | 6/2017 | Jeon | H04W 76/11 |
| 2017/0346934 A1* | 11/2017 | Dentamaro | H04M 1/72412 |
| 2020/0293090 A1 | 9/2020 | Kanda | |
| 2022/0311858 A1* | 9/2022 | Kanao | H02J 50/90 |
| 2023/0064633 A1* | 3/2023 | Pienaar | G06F 3/167 |
| 2023/0373403 A1* | 11/2023 | Liu | H02J 7/0044 |

FOREIGN PATENT DOCUMENTS

| | | | | |
|---|---|---|---|---|
| CN | 103770749 A | | 5/2014 | |
| CN | 104638694 B | * | 1/2018 | ............ H02J 7/025 |
| CN | 108474841 A | * | 8/2018 | ........... A61B 5/0205 |
| CN | 109688572 A | | 4/2019 | |
| CN | 111201692 A | | 5/2020 | |
| JP | 2014-003564 A | | 1/2014 | |
| JP | 2020019454 A | | 2/2020 | |
| JP | 2021-54329 A | | 4/2021 | |
| KR | 20170044905 A | * | 4/2017 | |
| KR | 20170067423 A | * | 4/2017 | |
| KR | 20200049535 A | * | 5/2020 | |
| KR | 102124197 B1 | | 6/2020 | |
| KR | 102197004 B1 | * | 12/2020 | |
| KR | 20230168727 A | * | 12/2023 | |
| WO | WO-2023075463 A1 | * | 5/2023 | |

* cited by examiner

CHECKED THAT MOBILE TERMINAL
HAS BEEN PLACED ON WIRELESS
CHARGERSTART CHARGING

DO YOU WANT TO
CONTINUE MIRRORING?

YES    NO

FIG.11E

LET'S TRY
YOUR MOBILE TERMINAL CAN BE
OPERATED ON TOUCH PANEL OF
THIS DISPLAY.
PLEASE TOUCH IT.

FIG.11F

MOBILE TERMINAL HAS BEEN REMOVED
FROM WIRELESS CHARGER
DO YOU WANT TO STOP MIRRORING?

| YES | NO |

YOUR MOBILE TERMINAL MAY BE ABLE TO
CONNECT TO IN-VEHICLE DEVICE
DO YOU WANT MIRRORING?

SCREEN OF YOUR MOBILE TERMINAL
CAN BE DISPLAYED ON DISPLAY AS
FOLLOWS

STEP1:
STEP2:
STEP3:
STEP4:

FIG.11I
MIRRORING HAS BEEN INTERRUPTED
FIG.11J
IF YOU WANT TO EASILY CONNECT
YOUR MOBILE TERMINAL TO
IN-VEHICLE DEVICE,
PLEASE INSTALL BELOW
  
OS1           OS2

START APPLICATION INSTALLED ON
YOUR MOBILE TERMINAL AND
START MIRRORING

INCOMING CALL

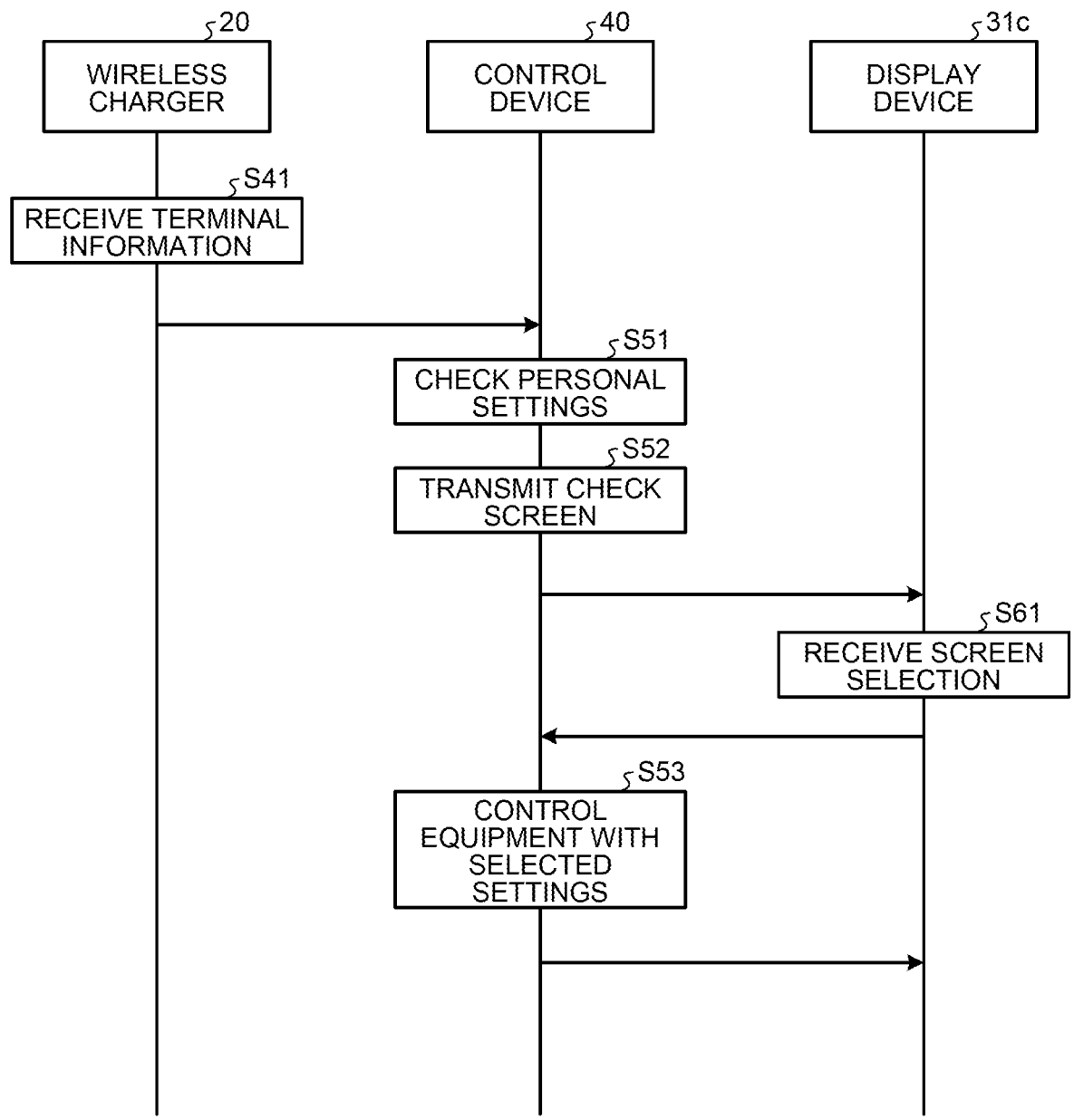

ELECTRONIC DEVICE LINKING SYSTEM, CONTROL DEVICE, AND METHOD

CROSS-REFERENCE TO RELATED APPLICATIONS

This application is based upon and claims the benefit of priority from Japanese Patent Application No. 2021-054329, filed on Mar. 26, 2021, the entire contents of which are incorporated herein by reference.

FIELD

The present disclosure relates to an electronic device linking system, a control device, and a method.

BACKGROUND

Conventionally, there has been a need to use a mobile terminal device, such as a smartphone, in the interior space of an automobile. On the other hand, in-vehicle equipment, such as a high-quality music reproduction device or a video display device, may be installed in a vehicle (for example, Japanese Patent Application Laid-open No. 2014-003564). However, even if an electronic device being linkable with a mobile terminal device is installed, there is a possibility that the user does not notice the existence of the electronic device, or the operation for linking is complicated or unknown to the user.

Therefore, there is a need to easily and conveniently use the peripheral electronic devices.

SUMMARY

An electronic device linking system according to an embodiment includes one or more electronic devices, a control device that controls the electronic device, and a wireless charger that charges the mobile terminal device. The wireless charger includes a first hardware processor that receives terminal information of the mobile terminal device by wireless communication with the mobile terminal device, and transmits, to the control device, the terminal information of the mobile terminal device received through the wireless communication. The control device includes a second hardware processor that links the mobile terminal device and the electronic device with each other on the basis of the terminal information received from the wireless charger.

BRIEF DESCRIPTION OF THE DRAWINGS

FIGS. 11A to 11M are examples of screens displayed on a display by the electronic device according to the embodiment;

FIG. 13 is a diagram illustrating an example of a sequence for linking by the electronic device linking system according to the modification example of the present embodiment.

DETAILED DESCRIPTION

Hereinafter, embodiments of an electronic device linking system, a control device, and a method according to the present disclosure will be described with reference to the diagrams.

EMBODIMENTS

Figure 1:
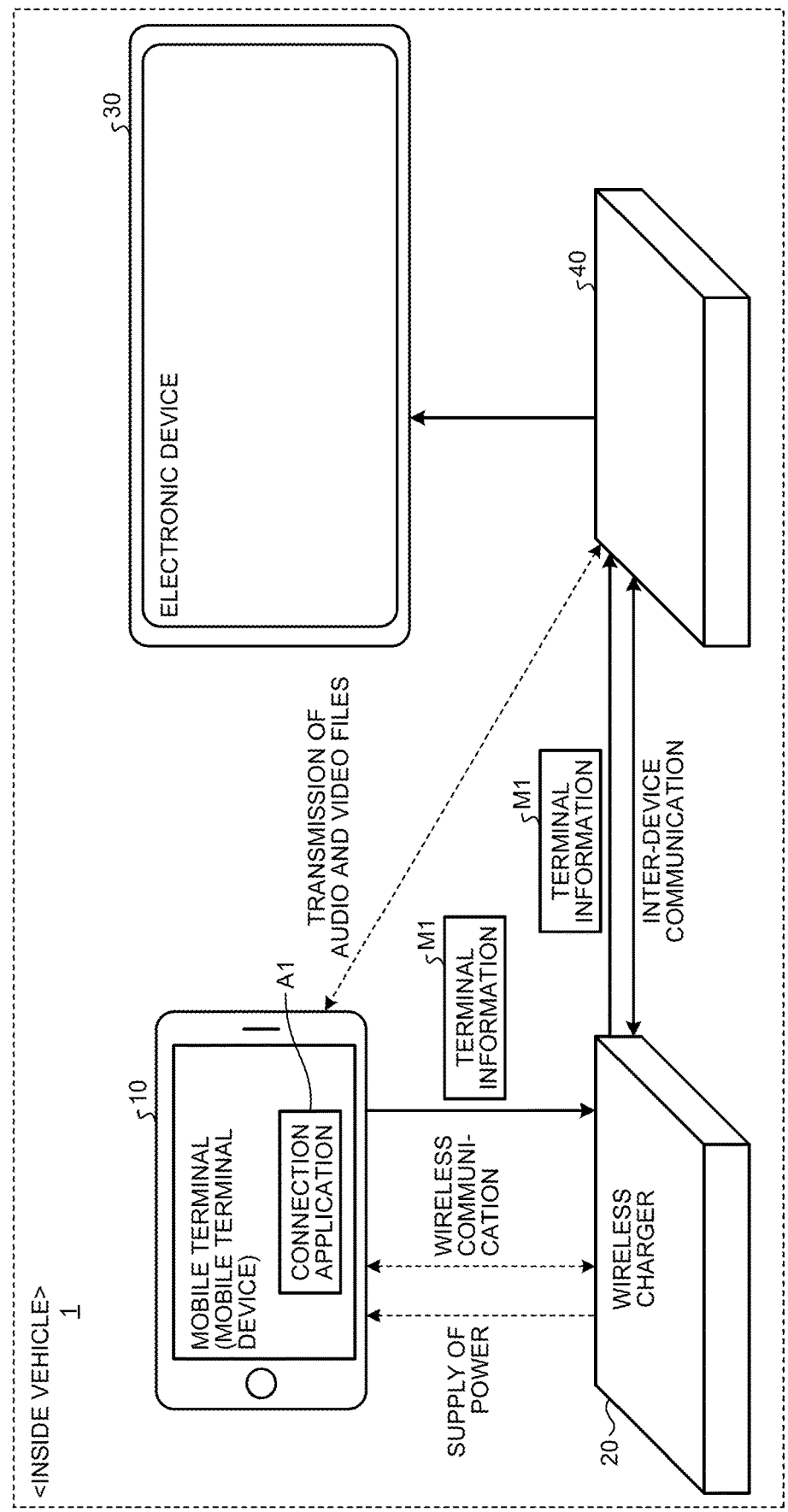
FIG. 1 is a diagram illustrating an example of the configuration of an electronic device linking system according to an embodiment.

FIG. 1 is a diagram illustrating an example of the configuration of an electronic device linking system according to an embodiment. As an example of the electronic device linking system, a system for linking a mobile terminal device (a mobile terminal 10) with an electronic device in a case where the user uses the mobile terminal device in the interior space of an automobile will be described.

As illustrated in FIG. 1, an electronic device linking system 1 includes a wireless charger 20, an electronic device 30, and a control device 40.

The mobile terminal 10 is a mobile terminal device such as a smartphone owned by the user. As illustrated in FIG. 1, the user downloads and installs in advance, on the mobile terminal 10, an application (hereinafter, abbreviated as a "connection application") A1 that automatically performs a setting (or configuration) for connection with the control device 40.

The wireless charger 20 is a charger that charges the mobile terminal 10 in a contactless manner. In other words, the wireless charger 20 is able to charge the mobile terminal 10 without being connected to the mobile terminal 10 with a cable or the like. For example, the wireless charger 20 has a charging area for charging the mobile terminal 10. When the mobile terminal 10 is placed in the charging area, the wireless charger 20 starts charging the mobile terminal 10.

The electronic device 30 is an electronic device that is linkable with the mobile terminal 10 and is disposed in the vehicle. The electronic device 30 is, for example, a music reproduction device or a video display device.

The control device 40 is, for example, a head unit. For example, the control device 40 enables a video display device, which is the electronic device 30 connected to the head unit, to display or reproduce a video file of the mobile terminal 10. In addition, the control device 40 enables an audio device, which is the electronic device 30 connected to the head unit, to reproduce an audio file of the mobile terminal 10.

In the present embodiment, details of how the mobile terminal 10 as a setting target and the electronic device 30 are linked with each other will be described with respect to, in particular, a case where the electronic device 30 is a video display device. The electronic device 30 and the control device 40 configure, for example, a rear entertainment system provided in the automobile. The video display device includes, for example, a display that is larger than the screen of the mobile terminal 10. The display is, for example, a liquid crystal display or an organic EL display. The number and arrangement of displays are arbitrary. For example, the display is provided on the headrest of the front seat, on the back of the seat, or between the driver's seat and the passenger seat.

In FIG. 1, the wireless charger 20, the electronic device 30, and the control device 40 are provided inside the vehicle. When the mobile terminal 10 is brought into the vehicle by the user and placed on the wireless charger 20, a linking operation between the mobile terminal 10 and the electronic device 30 is started. For example, when the mobile terminal 10 is placed on the wireless charger 20, the wireless charger 20 receives terminal information M1 from the mobile terminal 10 by wireless communication as illustrated in FIG. 1. The wireless charger 20 includes a first communication unit and a second communication unit. The wireless charger 20 wirelessly communicates with the mobile terminal 10 by the first communication unit, and receives the terminal information M1 from the mobile terminal 10. The wireless charger 20 transmits the terminal information M1 to the control device 40 by inter-device communication. The wireless charger 20 performs inter-device communication with the control device 40 by the second communication unit, and transmits the terminal information M1 to the control device 40. The control device 40 starts a linking operation between the mobile terminal 10 and the electronic device 30 on the basis of the terminal information M1 transmitted from the wireless charger 20. The control device 40 includes a communication unit. The control device 40 wirelessly communicates with the mobile terminal 10 by the communication unit, and performs a setting (or configuration) for linking the mobile terminal 10 and the electronic device 30 with each other.

When the linking between the mobile terminal 10 and the electronic device 30 is completed, a video file or an audio file is transmitted from the mobile terminal 10 to the control device 40. The control device 40 transmits a video file or an audio file to the electronic device 30, and thereby the electronic device 30 can display or reproduce the file of the mobile terminal 10. While the mobile terminal 10 is placed on the wireless charger 20, the mobile terminal 10 is charged by power supplied from the wireless charger 20.

The wireless charger 20 and the control device 40 may be connected to each other by wire or wirelessly. The electronic device 30 and the control device 40 may be connected to each other by wire or wirelessly. The control device 40 may be configured integrally with the electronic device 30.

Figure 2:
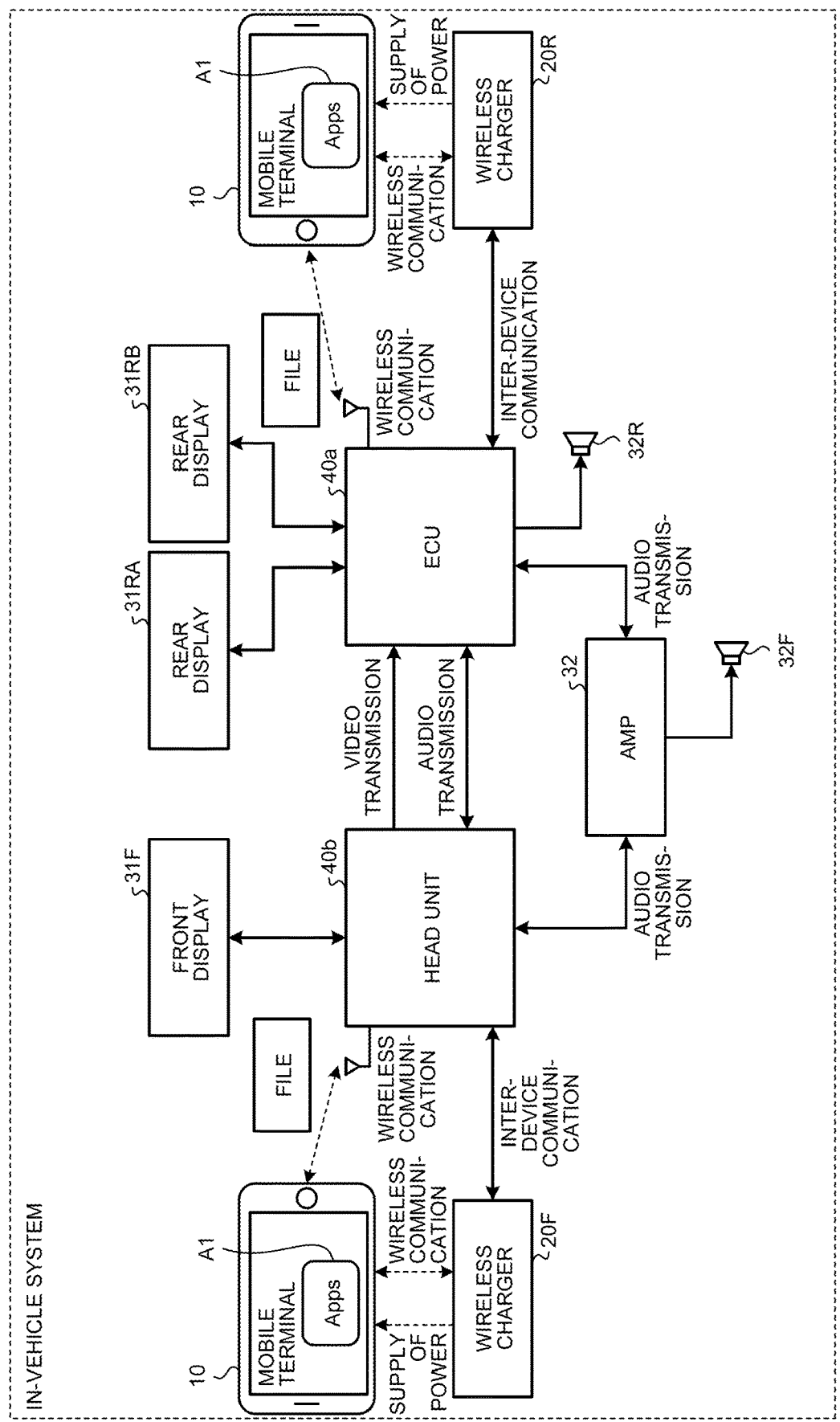
FIG. 2 is a diagram illustrating an example of the configuration of a hardware block of an in-vehicle system according to the embodiment.

FIG. 2 is a diagram illustrating an example of the configuration of a hardware block of an in-vehicle system. The in-vehicle system illustrated in FIG. 2 represents an entire in-vehicle system including a front system for occupants in the driver's seat or the passenger seat and a rear system for occupants in the rear seat. Hereinafter, devices and the like provided for the occupants in the driver's seat or the passenger seat may be referred to as front devices and the like, and devices and the like provided for the occupants in the rear seat may be referred to as rear devices and the like.

In the example illustrated in FIG. 2, a front wireless charger 20F and a rear wireless charger 20R are provided. In addition, in the example illustrated in FIG. 2, a front display 31F, a rear display 31RA, and a rear display 31RB are provided. The display 31F, the display 31RA, and the display 31RB are examples of the electronic device 30. The display 31F is connected to a head unit 40b. The display 31RA and the display 31RB are connected to an ECU 40a. The head unit 40b and the ECU 40a are examples of the control device.

In addition, FIG. 2 also illustrates an amplifier 32, a speaker 32F, and a speaker 32R as audio devices. The speaker 32F is a front speaker installed in the vehicle. The speaker 32R is a rear speaker installed in the vehicle.

The head unit 40b and the ECU 40a are connected to each other through a communication cable or the like, and transmit video or audio information by inter-device communication. The audio information is, for example, voice information or music information.

In the configuration illustrated in FIG. 2, the wireless charger 20F, the head unit 40b, and the display 31F mainly construct a front electronic device linking system. In addition, the wireless charger 20R, the ECU 40a, the display 31RA, and the display 31RB mainly construct a rear electronic device linking system.

The wireless charger 20F is installed, for example, beside the driver's seat. When the user places the mobile terminal 10 on the wireless charger 20F after boarding, the head unit 40b starts a linking operation between the mobile terminal 10 and the display 31F. This enables the display 31F to display or reproduce the file of the mobile terminal 10.

The wireless charger 20R is installed, for example, in the user space in the rear seat. The user space in the rear seat is, for example, an armrest portion, above a free storage box, or a rear portion of the front seat. When the user places the mobile terminal 10 on the wireless charger 20R after boarding, the ECU 40a starts a linking operation between the mobile terminal 10 and the display 31RA and the display 31RB. This enables the display 31RA and the display 31RB to display or reproduce the file of the mobile terminal 10.

Figure 3:
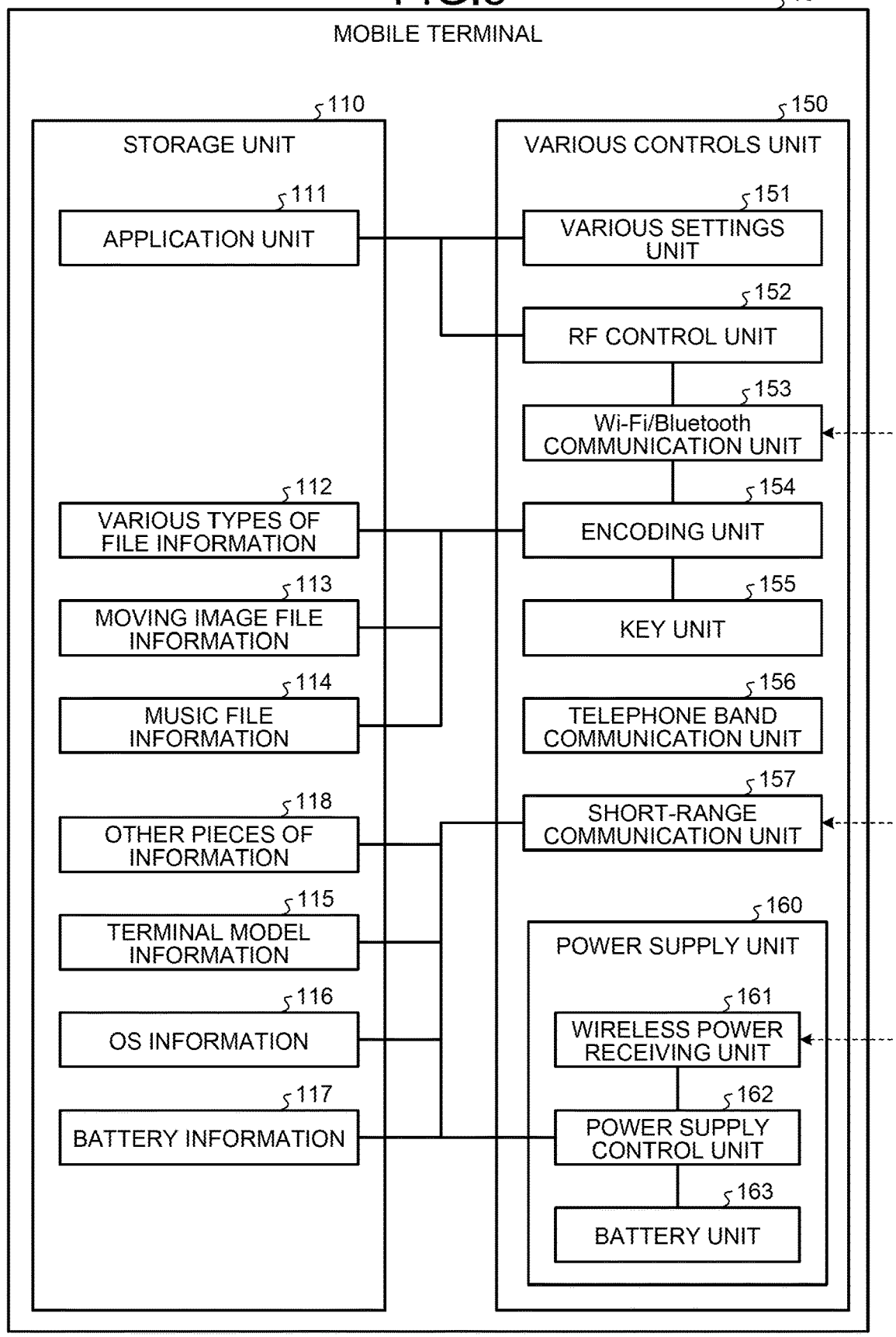
FIG. 3 is a diagram illustrating an example of the configuration of a mobile terminal according to the embodiment.

FIG. 3 is a diagram illustrating an example of the configuration of the mobile terminal 10. The mobile terminal 10 illustrated in FIG. 3 includes a storage unit 110 and a various controls unit 150.

The various controls unit 150 includes a various settings unit 151, an RF control unit 152, and a Wi-Fi/Bluetooth (registered trademark) communication unit 153. The various settings unit 151 set an application unit 111 included in the storage unit 110. The application unit 111 includes a connection application or the like for a setting (or configuration) of mirroring, and appropriately receives various settings from the various settings unit 151. Mirroring refers to displaying, on a display screen of another device, at least part of pieces of information displayed on the display screen of the mobile terminal 10. By performing the mirroring, the display screen of the mobile terminal 10 can be displayed on the display 31F, for example. The RF control unit 152 controls settings, such as a setting of mirroring between the control device 40 and the application unit 111, through the Wi-Fi/Bluetooth communication unit 153 according to instructions from the application unit 111 and the control device 40.

The Wi-Fi/Bluetooth communication unit 153 communicates with other devices by Wi-Fi or Bluetooth. For example, the Wi-Fi/Bluetooth communication unit 153 establishes a Bluetooth connection to communicate with the control device 40. Alternatively, for example, when performing mirroring, the Wi-Fi/Bluetooth communication unit 153 establishes a Wi-Fi connection to communicate with the control device 40.

The various controls unit 150 may include an encoding unit 154, a key unit 155, a telephone band communication unit 156, a short-range communication unit 157, and a power supply unit 160.

The encoding unit 154 encodes information of the key unit 155 for establishing a Wi-Fi connection, and transmits the encoded information from the Wi-Fi/Bluetooth communication unit 153 to the control device 40. In addition, the encoding unit 154 encodes file information stored in the storage unit 110 and transmits the encoded file information from the Wi-Fi/Bluetooth communication unit 153 to the electronic device 30. The file information stored in the storage unit 110 is, for example, various types of file information 112, moving image file information 113, and music file information 114.

The key unit 155 has information for establishing a Wi-Fi connection. The key unit 155 has, for example, a copyright protection key. The copyright protection key is, for example, HDCP or DTCP.

The telephone band communication unit 156 is a communication unit that makes a voice call with another mobile phone in the telephone band. The telephone band communication unit 156 transmits the voice of a sender input to the internal microphone unit, as a voice signal, to the internal antenna unit. In addition, the telephone band communication unit 156 outputs the voice signal received by the antenna to the speaker.

The short-range communication unit 157 performs proximity communication with other devices. The proximity communication is compliant with, for example, the near field communication (NFC) standard. The short-range communication unit 157 transmits terminal information stored in the storage unit 110. The terminal information is, for example, terminal model information 115, OS information 116, battery information 117, and other pieces of information 118. The OS information 116 is information of the type, version, or the like of an OS such as Android (registered trademark). The battery information 117 is information of the remaining battery level or the like.

In addition, the terminal information stored in the storage unit 110 is stored in the NFC tag. The terminal information may be read or written by a device having NFC reader and writer functions.

The power supply unit 160 includes a wireless power receiving unit 161, a power supply control unit 162, and a battery unit 163 being a secondary battery. The wireless power receiving unit 161 receives power from the wireless charger 20 on the power transmitting side wirelessly by an electromagnetic induction method using an induced magnetic flux generated between the power transmitting side and the power receiving side, thereby charging the battery unit 163. The power supply control unit 162 includes a power supply control circuit that supplies electric power stored in the battery unit 163 to each unit as driving power. In addition, the power supply control unit 162 measures the remaining battery level of the battery unit 163, and stores the remaining battery level information, which is the measurement result, as the battery information 117.

The power supply method described above is mere an example, and is not limited to the electromagnetic induction method. The power supply method may be a magnetic field resonance method, an electric field coupling method, or the like.

The mobile terminal 10 includes a hardware processor and a memory. The processor may execute a computer program stored in the memory to implement the processing of each functional unit in the various controls unit 150.

The processor is, for example, a central processing unit (CPU), a micro processing unit (MPU), a large scale integration (LSI), an application specific integrated circuit (ASIC), a programmable logic device (PLD), or a field-programmable gate array (FPGA).

The memory stores computer programs and data handled by the mobile terminal 10. The memory may include a read-only memory (ROM) and a random access memory (RAM). In addition, the memory may include a volatile memory and a non-volatile memory.

Figure 4:
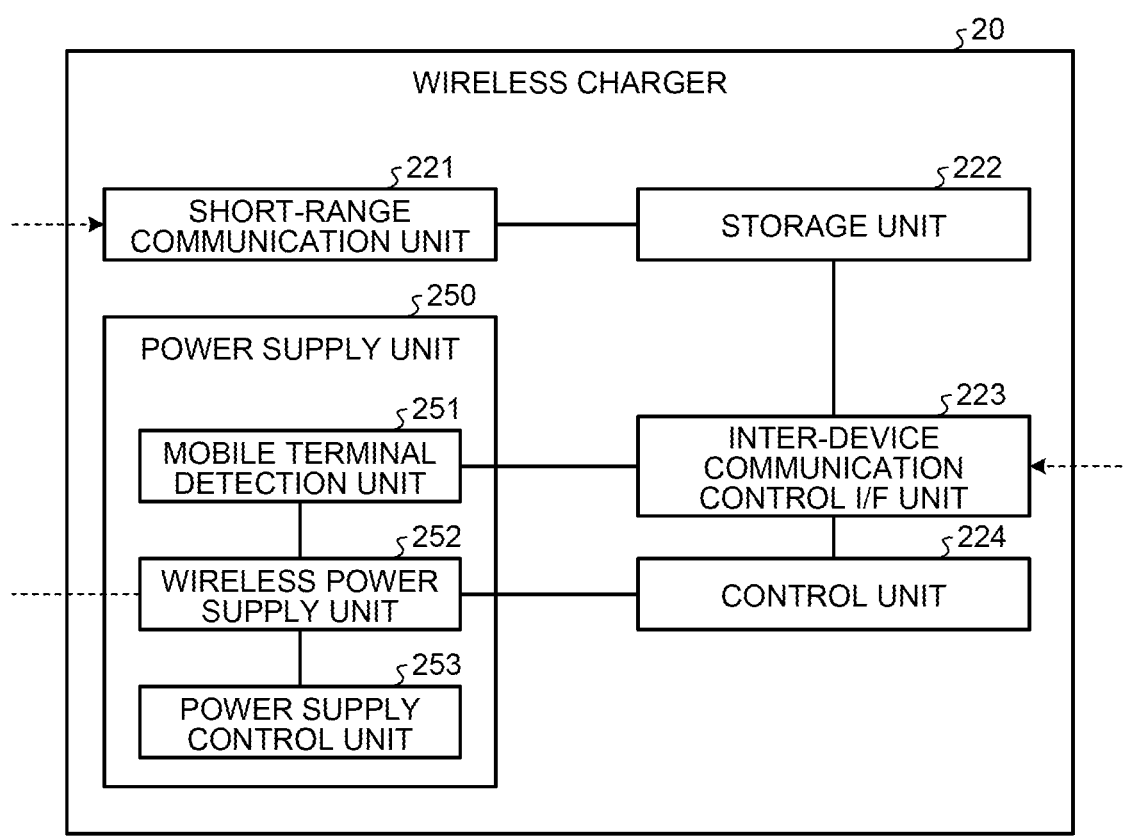
FIG. 4 is a diagram illustrating an example of the configuration of a wireless charger according to the embodiment.

FIG. 4 is a diagram illustrating an example of the configuration of the wireless charger 20. The wireless charger 20 illustrated in FIG. 4 includes a short-range communication unit 221, a storage unit 222, an inter-device communication control I/F unit 223, a control unit 224, and a power supply unit 250.

The short-range communication unit 221 performs proximity communication. The short-range communication unit 221 is an example of the first communication unit. The proximity communication is compliant with, for example, the near field communication (NFC) standard. The short-range communication unit 221 communicates with the mobile terminal 10 and receives the terminal model information 115 as the terminal information M1, the OS information 116, and the battery information 117 as a status from the mobile terminal 10. In other words, the short-range communication unit 221 functions as an NFC reader. The terminal information received by the short-range communication unit 221 is output to the storage unit 222. As a result, the data in the storage unit 222 is updated to the latest data from time to time.

The control unit 224 controls the inter-device communication control I/F unit 223 and the power supply unit 250. The power supply unit 250 includes a mobile terminal detection unit 251, a wireless power supply unit 252, and a power supply control unit 253. The power supply control unit 253 is connected to an AC power supply or the like provided in the vehicle by a power cable to supply electric power to the wireless power supply unit 252. The AC power supply provided in the vehicle is, for example, a battery power supply in a vehicle.

The mobile terminal detection unit 251 detects a situation that the mobile terminal 10 has been placed on the arrangement surface of the wireless charger 20. The mobile terminal detection unit 251 is a detection sensor such as a contact sensor. When the mobile terminal detection unit 251 detects the situation that the mobile terminal 10 has been placed on the arrangement surface of the wireless charger 20, the wireless power supply unit 252 starts wireless power supply to the mobile terminal 10. Wireless power supply is performed by, for example, an electromagnetic induction method. In addition, the power supply method described above is mere an example, and is not limited to the electromagnetic induction method. The power supply method may be a magnetic field resonance method, an electric field coupling method, or the like.

When the mobile terminal 10 is detected by the mobile terminal detection unit 251, the inter-device communication control I/F unit 223 performs inter-device communication with the control device 40. The inter-device communication control I/F unit 223 corresponds to the second communication unit. When the inter-device communication with the control device 40 is started, the inter-device communication control I/F unit 223 receives the latest terminal information M1 of the mobile terminal 10 from the storage unit 222 and transmits the latest terminal information M1 to the control device 40.

The wireless charger 20 includes a hardware processor (the first hardware processor) and a memory. The processor may execute a computer program stored in the memory to implement the processing of each functional unit of the short-range communication unit 221, the inter-device communication control I/F unit 223, the control unit 224, and the power supply unit 250.

The processor is, for example, a central processing unit (CPU), a micro processing unit (MPU), a large scale integration (LSI), an application specific integrated circuit (ASIC), a programmable logic device (PLD), or a field-programmable gate array (FPGA).

The memory stores computer programs and data handled by the wireless charger 20. The memory may include a read-only memory (ROM) and a random access memory (RAM). In addition, the memory may include a volatile memory and a non-volatile memory.

Figure 5:
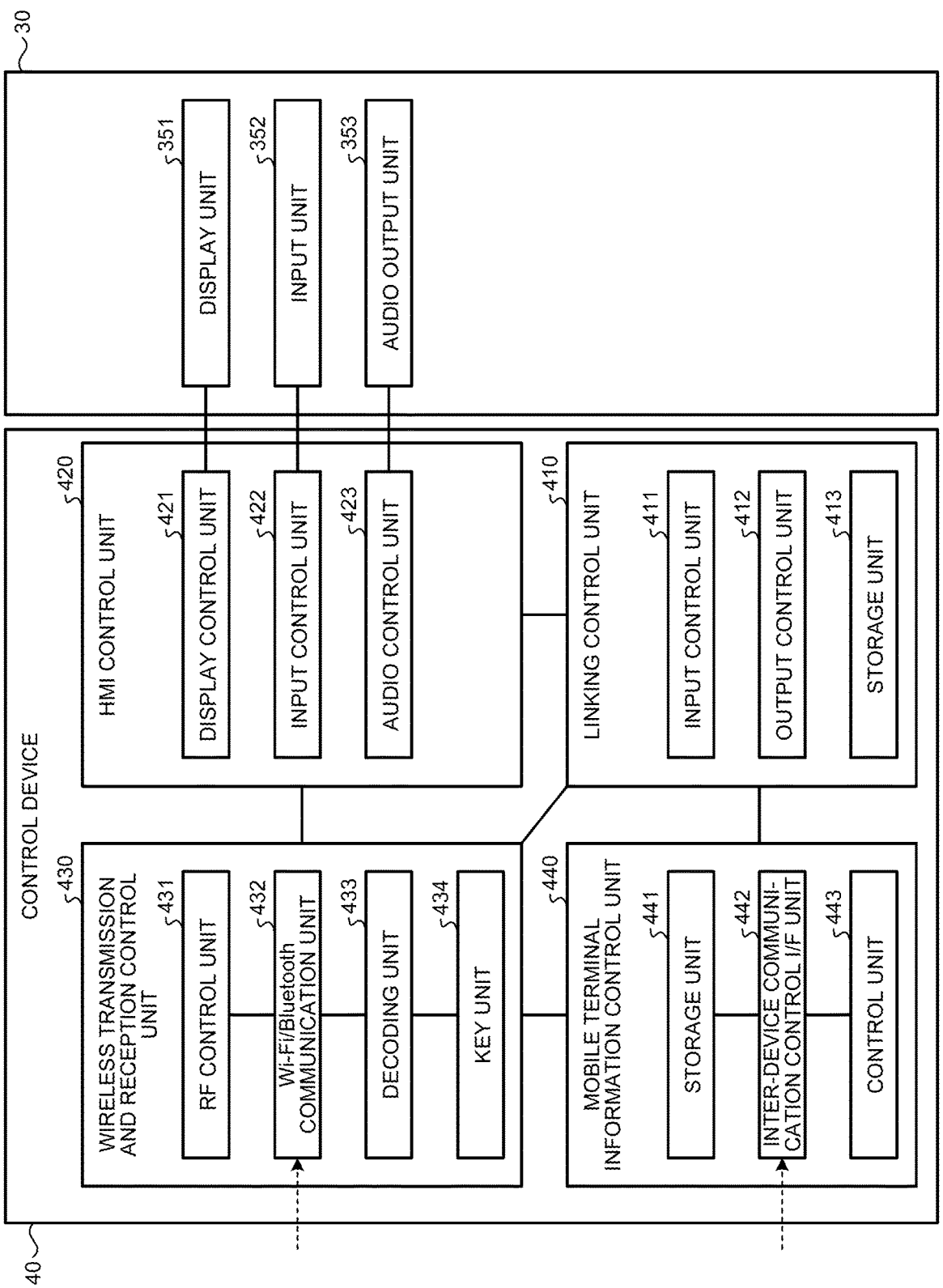
FIG. 5 is a diagram illustrating an example of the configuration of an electronic device and a control device according to the embodiment.

FIG. 5 is a diagram illustrating an example of the configuration of the electronic device 30 and the control device 40. The control device 40 is, for example, the ECU 40a (FIG. 2). In addition, the control device 40 may be, for example, the head unit 40b. The control device 40 illustrated in FIG. 5 includes a linking control unit 410, an HMI control unit 420, a wireless transmission and reception control unit 430, and a mobile terminal information control unit 440. In the configuration illustrated in FIG. 5, the linking control unit 410 corresponds to a "setting unit". An output control unit 412 and a display control unit 421 each correspond to a "display unit". An input control unit 411 and an input control unit 422 each correspond to a "reception unit". An RF control unit 431 and a Wi-Fi/Bluetooth communication unit 432 each correspond to a "communication unit".

The linking control unit 410 performs input/output control and settings for performing an operation for linking with the mobile terminal 10. The linking control unit 410 includes the input control unit 411, the output control unit 412, and a storage unit 413 as an example.

For example, the storage unit 413 stores various kinds of screen information (see FIGS. 11A to 11M) to be displayed for various notifications or checks for the user. The linking control unit 410 controls, for example, reception of an input from the user by the input control unit 411 or display of various kinds of screen information on the electronic device 30 by the output control unit 412. For example, in a case that the electronic device 30 includes a touch input type touch panel in the display device, the linking control unit 410 can receive screen operations, such as selection and input, from the user through the touch panel on the display screen displayed on the display device. In addition, after linking between the electronic device 30 and the mobile terminal 10, when a screen operation such as selection and input is received from the user through the touch panel on the display screen of the mobile terminal 10 displayed on the display device, the linking control unit 410 can transmit an operation signal to the mobile terminal 10 through the communication unit. In addition, the linking control unit 410 as a setting unit performs various settings for linking. The detailed linking operation will be described later using a sequence diagram and a flow diagram.

A human machine interface (HMI) control unit 420 controls control for display on the electronic device 30, audio output control, and input from the user. After the communication between the control device 40 and the mobile terminal 10 is established, the HMI control unit 420 receives a video file or an audio file from the mobile terminal 10 through the wireless transmission and reception control unit 430 and outputs the video file or the audio file to the electronic device 30. In addition, by using a function called UIBC (User Input Back Channel), it is possible for the user to operate the display screen of the mobile terminal 10 on the basis of the input to the electronic device 30. In this case, when an operation signal is input to the electronic device 30 by, for example, a touch input, the HMI control unit 420 transmits the operation signal to the mobile terminal 10 through the wireless transmission and reception control unit 430.

For example, when the control device 40 (FIG. 5) is the ECU 40a (FIG. 2), a display unit 351 is the front display 31F. When the control device 40 is the head unit 40b, the display unit 351 is the rear display 31RA or the rear display 31RB. Each of these displays 31F, 31RA, and 31RB may be a touch input type touch panel display. In this case, an input unit 352 is a touch panel display in the front display 31F, the rear display 31RA, and the rear display 31RB. The input unit 352 may be an operation button. The input unit 352 may be, for example, an operation button for operating the rear display 31F, an operation button for operating the rear display 31RA, or an operation button for operating the rear display 31RB. An audio output unit 353 is, for example, the amplifier 32, the speaker 32R, and the speaker 32F. In addition, in the following explanation, each of the front display 31F, the rear display 31RA, and the rear display 31RB will be collectively referred to as a display, and each of the speaker 32R and the speaker 32F will be collectively referred to as a speaker.

The wireless transmission and reception control unit 430 includes the RF control unit 431, the Wi-Fi/Bluetooth communication unit 432, a decoding unit 433, and a key unit 434.

The RF control unit 431 controls the Wi-Fi/Bluetooth communication unit 432. The Wi-Fi/Bluetooth communication unit 432 performs Bluetooth communication or Wi-Fi communication with the mobile terminal 10. For example, the Wi-Fi/Bluetooth communication unit 432 performs Bluetooth communication to notify the mobile terminal 10 of information. Alternatively, the Wi-Fi/Bluetooth communication unit 432 receives a video file or an audio file from the mobile terminal 10 by, for example, Wi-Fi communication. The video file or the audio file received by the Wi-Fi/Bluetooth communication unit 432 is output to the HMI control unit 420 through the linking control unit 410. In addition, the operation signal input to the electronic device 30 is transmitted to the mobile terminal 10 through the linking control unit 410 and the wireless transmission and reception control unit 430. The key unit 434 has information to be transmitted to the mobile terminal 10 in order to establish a Wi-Fi connection with the mobile terminal 10. The key unit 434 has, for example, a copyright protection key. The copyright protection key is, for example, HDCP or DTCP.

The mobile terminal information control unit 440 includes a storage unit 441, an inter-device communication control I/F unit 442, and a control unit 443. The control unit 443 controls inter-device communication between the wireless charger 20 and the control device 40. In addition, the control unit 443 causes the storage unit 441 to store the received terminal information M1. The inter-device communication control I/F unit 442 performs inter-device communication with the wireless charger 20. In addition, the inter-device communication control I/F unit 442 receives the terminal information M1 from the wireless charger 20 and causes the storage unit 441 to store the terminal information M1.

The control device 40 includes a hardware processor (the second hardware processor) and a memory, and the processor may execute a computer program stored in the memory to implement the processing of each functional unit of the wireless transmission and reception control unit 430, the mobile terminal information control unit 440, the HMI control unit 420, and the linking control unit 410.

The processor is, for example, a central processing unit (CPU), a micro processing unit (MPU), a large scale integration (LSI), an application specific integrated circuit (ASIC), a programmable logic device (PLD), or a field-programmable gate array (FPGA).

The memory stores computer programs and data handled by the control device 40. The memory may include a read-only memory (ROM) and a random access memory (RAM). In addition, the memory may include a volatile memory and a non-volatile memory.

Figure 6:
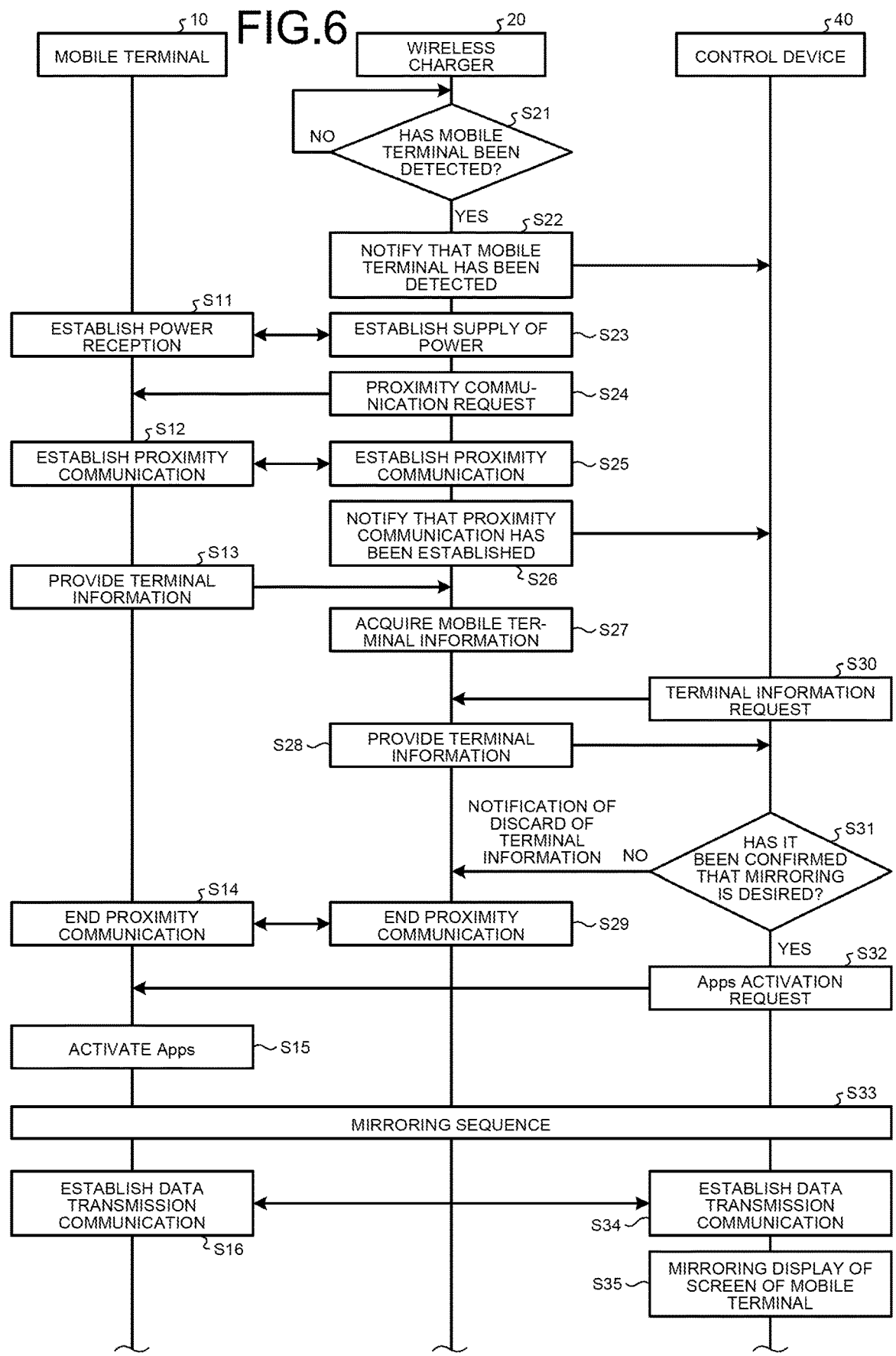
FIG. 6 is a diagram illustrating an example of a sequence of a linking operation of the electronic device linking system according to the embodiment.

FIG. 6 is a diagram illustrating an example of a sequence of a linking operation of the electronic device linking system 1. First, the wireless charger 20 performs detection of the mobile terminal 10 (S21). When the mobile terminal 10 is not detected (S21: No), detection of the mobile terminal 10 is repeatedly performed.

When the mobile terminal 10 is detected (S21: Yes), the wireless charger 20 gives, to the control device 40, a notification that the mobile terminal 10 has been detected (S22). Then, the wireless charger 20 establishes communication for supplying power to the mobile terminal 10. When the communication is established, the wireless charger 20 starts supplying power to the mobile terminal 10 (S23).

The mobile terminal 10 establishes communication for receiving power from the wireless charger 20. When the communication is established, the mobile terminal 10 starts receiving power from the wireless charger 20 (S11).

After the supply of power is started, the wireless charger 20 sends a request for proximity communication to the mobile terminal 10 (S24).

When the mobile terminal 10 receives the request for proximity communication from the wireless charger 20, the mobile terminal 10 establishes proximity communication with the wireless charger 20 (S12). After establishing proximity communication with the wireless charger 20, the mobile terminal 10 transmits terminal information to the wireless charger 20 (S13).

After establishing the proximity communication with the mobile terminal 10 (S25), the wireless charger 20 gives, to the control device 40, a notification that the proximity communication with the mobile terminal 10 has been established (S26). In addition, the wireless charger 20 receives the terminal information transmitted from the mobile terminal 10 (S27). When there is a request for terminal information from the control device 40 (S30), the wireless charger 20 transmits the terminal information to the control device 40 (S28).

When the terminal information from the wireless charger 20 is received, the control device 40 checks whether or not mirroring is desired (S31). The checking of whether or not mirroring is desired is performed, for example, on the basis of an input to the electronic device 30 by the user who looks at a check screen displayed on the display of the electronic device 30 by the control device 40. For example, the electronic device 30 includes a touch panel display, and an option as to whether or not mirroring is desired is displayed on the touch panel display. The user of this case can input whether or not mirroring is desired to the electronic device 30 by performing a touch operation on any option.

When the control device 40 receives through the electronic device 30 an input from the user indicating that the mirroring is not desired (S31: No), the control device 40 discards the terminal information and gives, to the wireless charger 20, a notification that the terminal information is discarded.

Upon receiving the notification of the discard of the terminal information from the control device 40, the wireless charger 20 ends the proximity communication with the mobile terminal 10 (S29), and the mobile terminal 10 also ends the proximity communication with the wireless charger 20 (S14).

On the other hand, when the control device 40 receives through the electronic device 30 an input from the user indicating that the mirroring is desired, that is, receives an input of consent for the mirroring from the user (S31: Yes), the control device 40 requests the mobile terminal 10 to activate a connection application (S32).

The mobile terminal 10 activates the connection application (S15), and performs, together with the control device 40, a sequence of a mirroring setting by the connection application (S33).

By performing this sequence, the mobile terminal 10 establishes data transmission communication by Wi-Fi with the control device 40 (S16), and also the control device 40 establishes data transmission communication by Wi-Fi with the mobile terminal 10 (S34). As a result, the display information of the mobile terminal 10 is displayed on the screen of the display of the electronic device 30 (S35). That is, the display information of the mobile terminal 10 can be displayed on the screen of the display of the electronic device 30, and the mobile terminal 10 can be operated by the electronic device 30. For example, when the electronic device 30 includes a touch panel display, the mobile terminal 10 can be operated by operating the screen displayed on the touch panel display.

Figure 7:
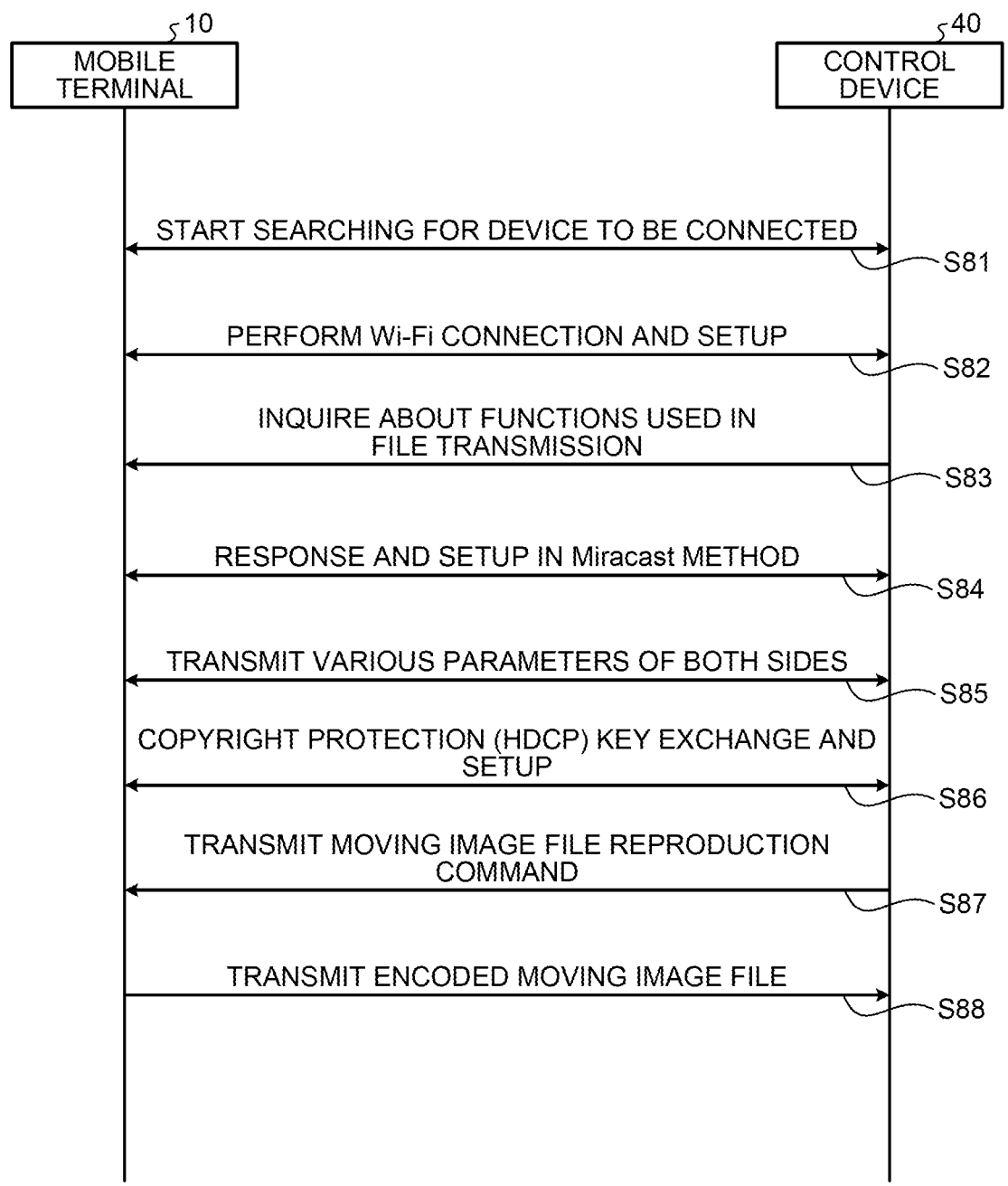
FIG. 7 is a diagram illustrating an example of a mirroring sequence and transmission communication establishment according to the embodiment.

FIG. 7 is a diagram illustrating an example of a mirroring sequence and transmission communication establishment between the mobile terminal 10 and the control device 40. First, the mobile terminal 10 starts searching for a device to be connected by Wi-Fi communication (S81).

The mobile terminal 10 and the control device 40 detect each other as Wi-Fi connection partners by checking data. Both the mobile terminal 10 and the control device 40 perform Wi-Fi connection and setup (S82).

Then, the control device 40 inquires the mobile terminal 10 about what kind of function of Wi-Fi is used to transmit a file (S83). In the present embodiment, as an example, it is assumed that both the mobile terminal 10 and the control device 40 agree to transmit and receive a moving image file by the Miracast method. Additionally, the following description will be given with assuming that the transmission and reception are performed by the Miracast method.

Subsequently, both the mobile terminal 10 and the control device 40 perform response and setup of the Miracast method (S84). In addition, both the mobile terminal 10 and the control device 40 transmit various parameters (S85). The various parameters include, for example, a parameter indicating which resolution of the image can be displayed by the mobile terminal 10 and the electronic device 30. If the resolution settings of the mobile terminal 10 and the electronic device 30 do not match, the image is enlarged and displayed on the electronic device 30, for example. It is assumed that images having resolutions, such as 1920×1080, 1280×720, and 800×480, can be displayed on the electronic device 30 side. In this case, if an attempt is made to transmit a file having a resolution of 1280×720 from the mobile terminal 10, the control device 40 agrees and receives the file of 1280×720, and the electronic device 30 enlarges and displays the file at a resolution of 1920×1080.

Then, copyright protection key exchange and setup are performed in both the mobile terminal 10 and the control device 40 (S86).

After the completion of such a setting, the display information of the mobile terminal 10 is projected on the display of the electronic device 30 by communication with the Miracast method. For example, when a moving image file reproduction command is transmitted from the control device 40 to the mobile terminal 10 (S87), an encoded moving image file is transmitted from the mobile terminal 10 to the control device 40, and the moving image file of the mobile terminal 10 is reproduced and displayed on the display of the electronic device 30 (S88).

When the mobile terminal 10 is brought into the vehicle, the control device 40 prompts the user of the mobile terminal 10 to charge the mobile terminal 10 with the wireless charger 20 or to link the mobile terminal 10 with the electronic device 30 as follows.

Figure 8:
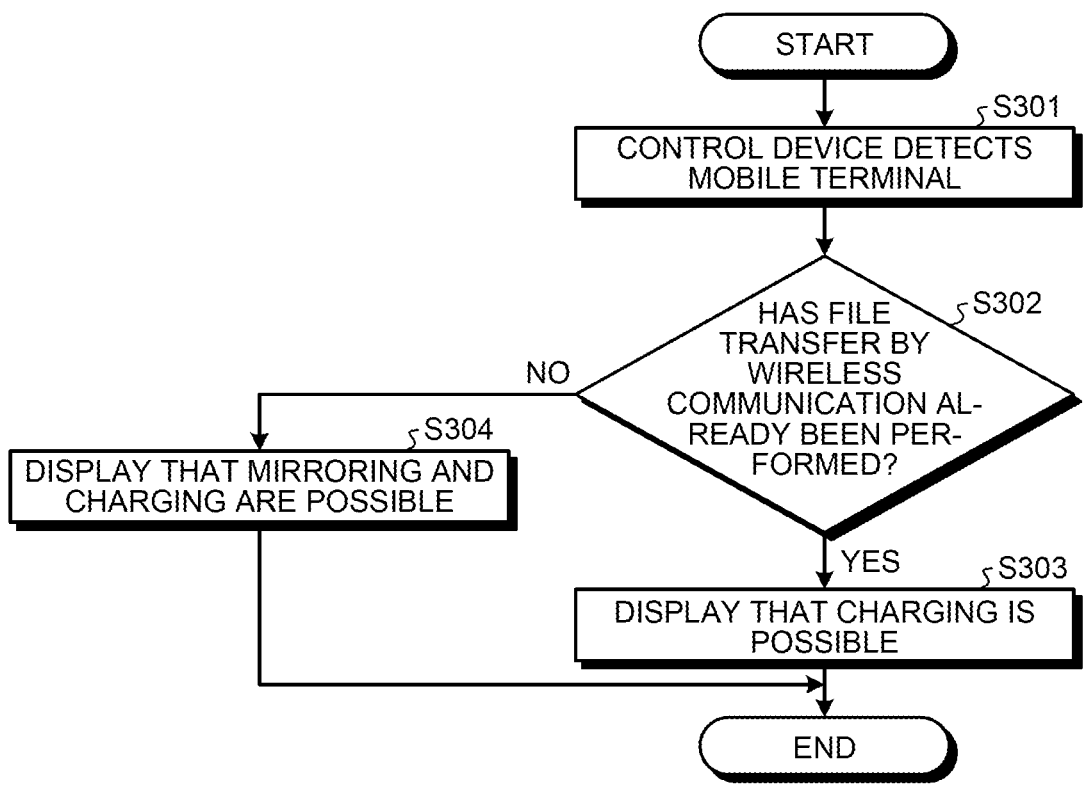
FIG. 8 is a diagram illustrating an example of a detailed flow of an operation of the control device according to the embodiment.

FIG. 8 is a diagram illustrating an example of a detailed flow of the operation of the control device 40. First, the control device 40 detects the surrounding mobile terminal 10 by Bluetooth communication or the like (S301).

The control device 40 determines whether or not file transfer by wireless communication has already been performed between the detected mobile terminal 10 and the control device 40 (S302). When the file transfer by wireless communication is performed between the mobile terminal 10 and the control device 40 (S302: Yes), a screen indicating that the mobile terminal 10 can be charged by the wireless charger 20 is displayed on the display of the electronic device 30 (S303), and this process ends. The wireless communication is, for example, communication by Bluetooth or communication by Wi-Fi.

On the other hand, when the file transfer by wireless communication is not performed between the mobile terminal 10 and the control device 40 (S302: No), the control device 40 displays a screen, which indicates that mirroring between the mobile terminal 10 and the electronic device 30 and charging of the mobile terminal 10 by the wireless charger 20 are possible, on the display of the electronic device 30 (S304), and ends this process.

Figure 9:
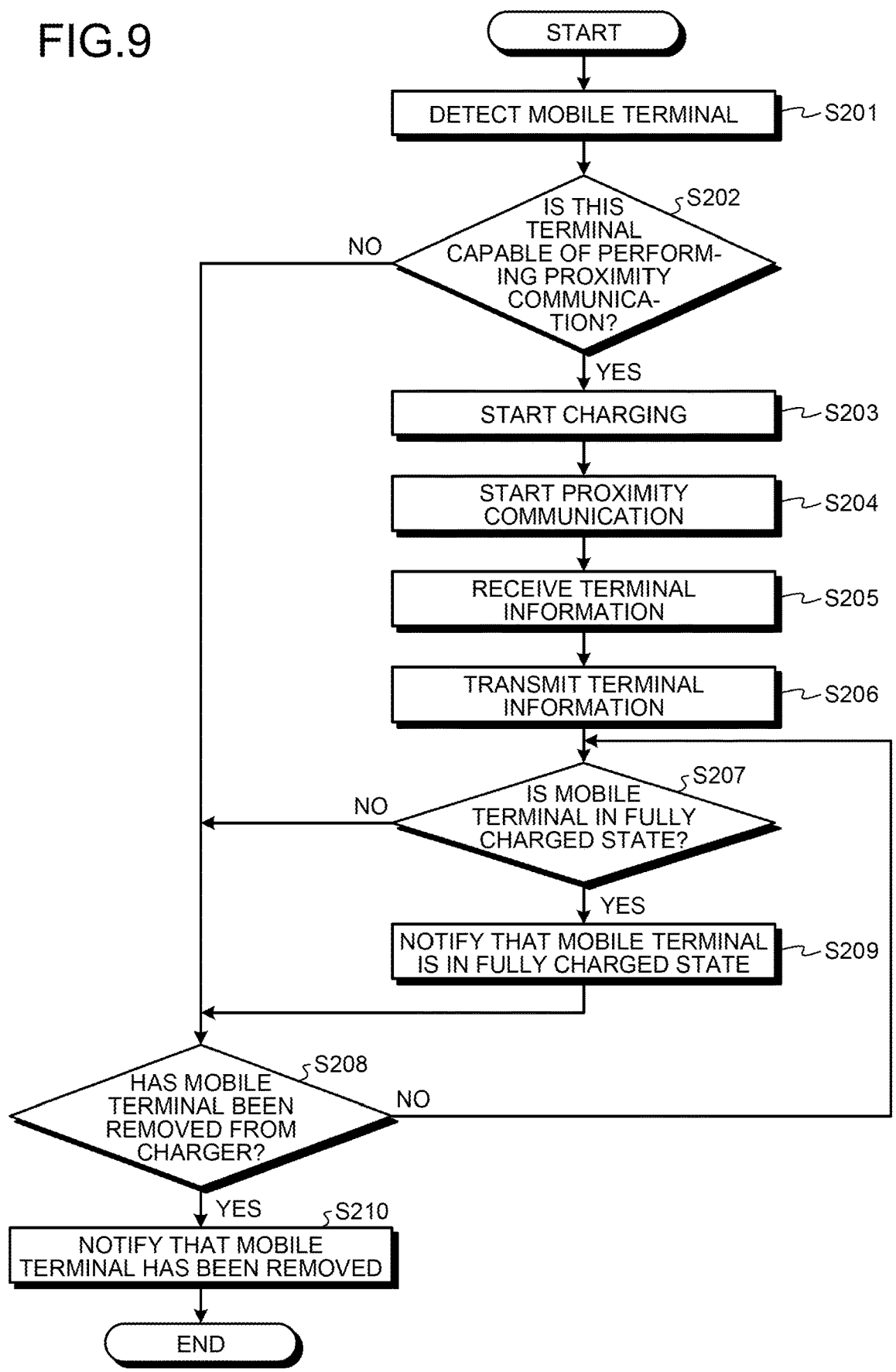
FIG. 9 is a diagram illustrating an example of a detailed flow of an operation of the wireless charger after the mobile terminal according to the embodiment is placed on the wireless charger.

FIG. 9 is a diagram illustrating an example of a detailed flow of the operation of the wireless charger 20 after the mobile terminal 10 is placed on the wireless charger 20. First, the wireless charger 20 detects a situation that the mobile terminal 10 is placed on the arrangement surface of the wireless charger 20 (S201).

The wireless charger 20 determines whether or not the mobile terminal 10 is a terminal capable of performing proximity communication (S202). When the mobile terminal 10 is capable of performing proximity communication (S202: Yes), the wireless charger 20 starts charging the mobile terminal 10 (S203). The wireless charger 20 also starts proximity communication with the mobile terminal 10 (S204).

When the proximity communication with the mobile terminal 10 is established, the wireless charger 20 receives terminal information from the mobile terminal 10 (S205).

The wireless charger 20 transmits the terminal information to the control device 40 (S206). After that, processing such as mirroring (see FIG. 10) is performed between the mobile terminal 10 and the control device 40.

After transmitting the terminal information, the wireless charger 20 determines whether or not the mobile terminal 10 is in a fully charged state (S207). The mobile terminal 10 is in a fully charged state means that the battery of the mobile terminal 10 is 100% charged. When the mobile terminal 10 is not in a fully charged state (S207: No), the wireless charger 20 determines whether or not the mobile terminal 10 has been removed from the wireless charger 20 (S208). When the mobile terminal 10 is not removed from the wireless charger 20 (S208: No), the wireless charger 20 repeats S207 and subsequent steps.

When the mobile terminal 10 is in a fully charged state (S207: Yes), the wireless charger 20 gives, to the control device 40, a notification that the mobile terminal 10 is in a fully charged state (S209), and the process proceeds to the determination of S208. At this time, the control device 40 may cause the electronic device 30 to display a screen indicating that the mobile terminal 10 is in a fully charged state.

When the mobile terminal 10 is removed from the wireless charger 20 (S208: Yes), the wireless charger 20 gives, to the control device 40, a notification that the mobile terminal 10 has been removed (S210). At this time, the control device 40 may cause the electronic device 30 to display a screen for asking the user whether to continue or disconnect the linking, such as mirroring, between the mobile terminal 10 and the control device 40.

Figure 10:
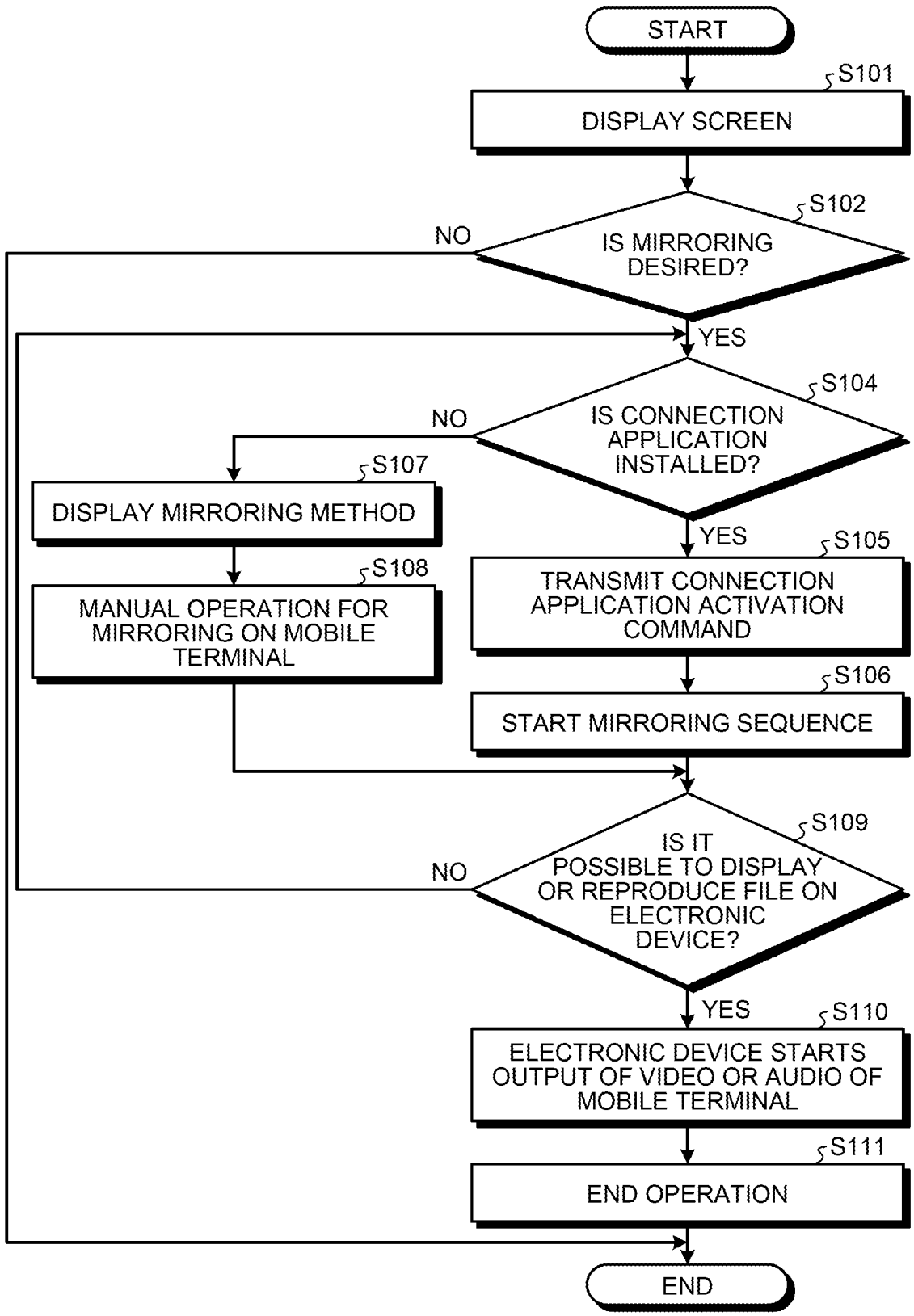
FIG. 10 is a diagram illustrating an example of a detailed flow of an operation for linking with the mobile terminal by the electronic device and the control device according to the embodiment.

FIG. 10 is a diagram illustrating an example of a detailed flow of an operation for linking with the mobile terminal 10 by the electronic device 30 and the control device 40. First, the control device 40 causes the display of the electronic device 30 to display a user check screen indicating whether or not mirroring between the mobile terminal 10 and the electronic device 30 is desired (S101). The user check screen is displayed on the basis of terminal information received from the wireless charger 20 (FIG. 9: S206).

Subsequently, the control device 40 determines whether or not the user desires mirroring (S102). For example, the control device 40 determines whether or not the user desires mirroring on the basis of the user's input on the user check screen displayed on the electronic device 30. The user's input is, for example, an input from a button provided in the electronic device 30, which corresponds to the option indicating the mirroring is desired or corresponds to the option indicating the mirroring is not desired.

When the user does not desire mirroring (S102: No), the control device 40 ends this process. When the user does not desire mirroring, the control device 40 may instruct the wireless charger 20 to discard the terminal information.

When the user desires mirroring (S102: Yes), the control device 40 determines whether or not a connection application has been installed in the mobile terminal 10 (S104). When the connection application has been installed in the mobile terminal 10 (S104: Yes), the control device 40 transmits a command for activating the connection application to the mobile terminal 10 (S105). In addition, the mirroring sequence is started on the control device 40 side (S106). As a result, communication for mirroring is automatically started between the control device 40 and the mobile terminal 10.

On the other hand, when the connection application has not been installed in the mobile terminal 10 (S104: No), the control device 40 displays, on the display of the electronic device 30, guide information indicating the setting procedure of the mobile terminal 10 for performing mirroring (S107). Then, a manual operation for the mirroring is performed on the mobile terminal 10 by the user, and thereby the mirroring is performed between the mobile terminal 10 and the control device 40 (S108).

The control device 40 determines whether or not the connection with the mobile terminal 10 has been completed and whether or not the file of the mobile terminal 10 can be displayed or reproduced by the electronic device 30 (S109). In response to determining that the connection with the mobile terminal 10 has not been completed or the file of the mobile terminal 10 cannot be displayed or reproduced by the electronic device 30 (S109: No), the control device 40 redoes S104 and subsequent steps. For example, when the communication between the mobile terminal 10 and the control device 40 by the connection application is not successful, the control device 40 may change the steps of the process such that mirroring is performed between the mobile terminal 10 and the control device 40 by manually operating the mobile terminal 10.

Then, in response to determining that the connection with the mobile terminal 10 has been completed and the file of the mobile terminal 10 can be displayed or reproduced by the electronic device 30 (S109: Yes), the control device 40 causes the electronic device 30 to start the output of the video or audio received from the mobile terminal 10 (S110).

Thereafter, when the electronic device 30 or the mobile terminal 10 is operated to end the linking between the electronic device 30 and the mobile terminal 10, the control device 40 disconnects the connection between the control device 40 and the mobile terminal 10 (S111), and ends this process.

Figure 11A:
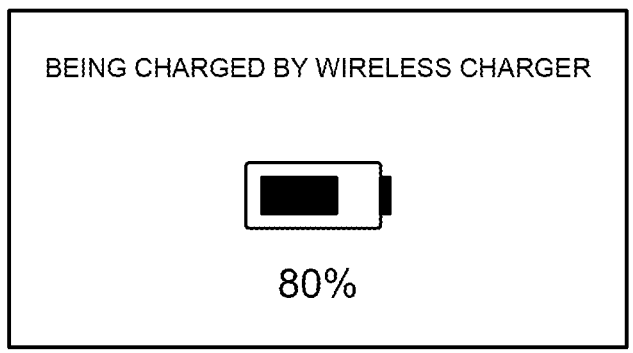

FIGS. 11A to 11M are examples of display screens displayed by the electronic device 30 on the display. FIG. 11A is an example of a display screen displayed by the electronic device 30 when the wireless charger 20 is charging the mobile terminal 10. In the example illustrated in FIG. 11A, it is indicated that the mobile terminal 10 is being charged by the wireless charger 20 and that the amount of charge of the mobile terminal 10 is 80%. For example, the control device 40 receives charging information as status information of the mobile terminal 10 from the wireless charger 20, and causes the electronic device 30 to display the display screen such that the amount of charge of the mobile terminal 10 is indicated on the basis of the amount of charge of the battery of the mobile terminal 10, that is, the remaining amount of the battery.

Figure 11B:
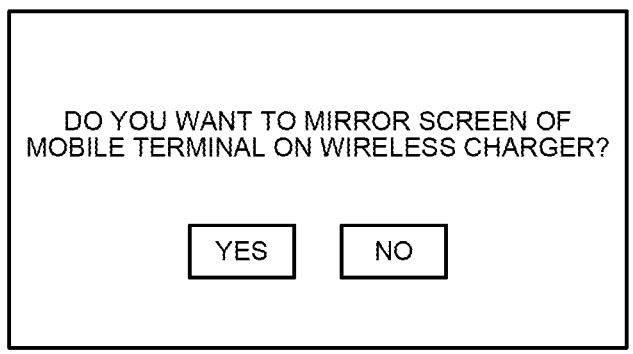

FIG. 11B is an example of a user check screen for making the user check whether or not to perform mirroring, which is displayed on the electronic device 30 when performing mirroring. In the example illustrated in FIG. 11B, a sentence asking whether or not to perform mirroring between the mobile terminal 10 and the electronic device 30 and a Yes button and a No button are displayed. The user can give an instruction to the control device 40 through the electronic device 30 as to whether or not to perform mirroring, in other words, whether or not to accept mirroring, by touch-inputting the Yes button or the No button displayed on the screen.

Figures 11C, 11D:
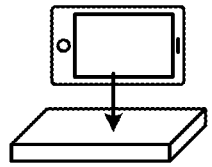

FIG. 11C is a notification screen displayed on the electronic device 30 at the timing when the wireless charger 20 starts charging the mobile terminal 10 after the mobile terminal 10 is placed on the wireless charger 20. In the example illustrated in FIG. 11C, it is indicated that the mobile terminal 10 is placed on the wireless charger 20 and that the wireless charger 20 starts charging the mobile terminal 10.

FIG. 11D is an example of a user check screen for asking the user whether or not to continue mirroring, which is displayed on the electronic device 30, for example, when the mobile terminal 10 is removed from the wireless charger 20. In the example illustrated in FIG. 11D, a sentence asking whether or not to continue mirroring between the mobile terminal 10 and the electronic device 30 and a Yes button and a No button are displayed. The user can give an instruction to the control device 40 through the electronic device 30 as to whether or not to continue mirroring by touching the Yes button or the No button displayed on the screen.

FIG. 11E is a display screen displayed on the electronic device 30 after the start of Miracast communication. In the example illustrated in FIG. 11E, it is indicated that the mobile terminal 10 can be operated by touch-inputting the touch panel display provided in the electronic device 30. FIG. 11E is also an example of a notification screen for notifying the user that the mobile terminal 10 and the electronic device 30 are linked with each other.

FIG. 11F is an example of a user check screen for asking the user whether or not to continue mirroring, which is displayed on the electronic device 30, for example, when the mobile terminal 10 is removed from the wireless charger 20. In the example illustrated in FIG. 11F, a sentence asking whether or not to stop mirroring between the mobile terminal 10 and the electronic device 30 and a Yes button and a No button are displayed. The user can give an instruction as to whether or not to stop mirroring by touching the Yes button or the No button displayed on the screen.

Figures 11G, 11H:

FIG. 11G is a notification screen displayed on the electronic device 30 when notifying the user of the mobile terminal 10 that the electronic device 30 can be used in a state in which the mobile terminal 10 is placed on the wireless charger 20. In the example illustrated in FIG. 11G, it is displayed that the mobile terminal 10 and the electronic device 30 can be linked with each other. From the screen in this example, the user can know that the mobile terminal 10 and the electronic device 30 can be linked with each other.

FIG. 11H is an example of a guide information screen indicating a setting procedure of the mobile terminal 10 in order to link the mobile terminal 10 and the electronic device 30 with each other. The display screen illustrated in FIG. 11H is displayed on the electronic device 30 when no connection application is installed in the mobile terminal 10. The user manually sets the mobile terminal 10 according to the guide information, so that the mobile terminal 10 and the electronic device 30 can be linked with each other.

FIG. 11I is a display screen displayed by the electronic device 30 when mirroring is interrupted between the mobile terminal 10 and the electronic device 30. In the example illustrated in FIG. 11I, it is indicated that mirroring has been interrupted.

FIG. 11J is a display screen displayed on the electronic device 30 in order to prompt the user to download a connection application to the mobile terminal 10. This screen is displayed on the electronic device 30 after the screens of FIGS. 11B, 11D, 11G, and the like, for example. On the screen illustrated in FIG. 11J, a different QR code (registered trademark) corresponding to the OS of the mobile terminal 10 is displayed as the acquisition destination of the connection application. On the screen illustrated in FIG. 11J, as an example, different QR codes are displayed for two types of OS, OS1 and OS2. By capturing the QR code corresponding to the OS of the mobile terminal 10 with the camera of the mobile terminal 10, the mobile terminal 10 connects to the URL specified by the QR code, and the connection application is downloaded and acquired from the connection destination site. By acquiring the connection application in advance in this manner, the mobile terminal 10 and the electronic device 30 can be easily linked with each other, in other words, the mobile terminal 10 and the control device 40 can be easily connected to each other.

Figures 11K, 11L:

FIG. 11K is a display screen displayed on the electronic device 30 when a connection application is activated when the connection application is installed in the mobile terminal 10. In the example illustrated in FIG. 11K, it is indicated that the connection application is activated and mirroring is started.

Figure 11M:
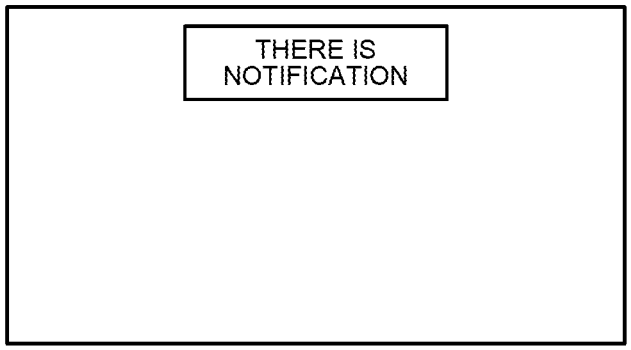

FIGS. 11L and 11M are examples of display screens displayed on the electronic device 30 when the mobile terminal 10 is placed on the wireless charger 20. Even if the mobile terminal 10 and the electronic device 30 do not perform linking, such as mirroring, the wireless charger 20 periodically communicates with the mobile terminal 10 to receive the state of the mobile terminal 10. Thus, information indicating a change in the state of the mobile terminal 10 can be transmitted from the wireless charger 20 to the control device 40 when there is a change in the state of the mobile terminal 10. For example, when the user places the mobile terminal 10 on the wireless charger 20 and the mobile terminal 10 is in a manner mode, the user may not notice an incoming call or an e-mail. In addition, when the wireless charger 20 is located in a place that is hard for the user to see, it may be difficult for the user to notice the change in the state of the mobile terminal 10 while charging the mobile terminal 10. The place that is hard for the user to see is, for example, under the lid of the armrest.

Considering the above situation, when information indicating a change in the state of the mobile terminal 10 is received from the wireless charger 20, the control device 40 causes the electronic device 30 to display a display screen corresponding to the received change information. FIG. 11L is an example of a display screen notifying that the mobile terminal 10 is receiving an incoming call. FIG. 11M is an example of a display screen notifying that there is a notification sent to the mobile terminal 10.

In this manner, the control device 40 causes the electronic device 30 to display the state of the mobile terminal 10, so that the user can check the state of the mobile terminal 10 on the screen of the electronic device 30 as well. As a result, even when the mobile terminal 10 is in the manner mode or the mobile terminal 10 is in a place that is difficult for the user to see, the user can easily notice that the mobile terminal 10 has received an incoming call or notification by looking at the screen of the electronic device 30.

In addition, in the rear display, there is a display in front of the user sitting in the rear seat. Therefore, the state of the mobile terminal 10 can be checked on the screen of the electronic device 30 at the position where the user is seated.

In addition, for example, when the user is watching TV on the electronic device 30, information indicating the state of the mobile terminal 10 may be popped up on the viewing screen. In this manner, if there is an incoming call on the mobile terminal 10 even while watching TV, "incoming call" is popped up on the screen of the electronic device 30, so that the user can easily notice the incoming call on the mobile terminal 10.

The control device appropriately performs notification of each screen. The display content or the display timing of each screen may be set as appropriate. The timing of displaying each screen in the present embodiment is mere an example, and is not limited to this example. The screen configuration is also an example, and is not limited to this configuration. The content to be displayed or the timing of display may be set as appropriate.

In addition, in the present embodiment, the flow when the mobile terminal 10 and the electronic device 30 are linked with each other to display the video file of the mobile terminal 10 on the electronic device 30 has been described as an example. Alternatively, the music file of the mobile terminal 10 may be reproduced by using the speaker in the vehicle. In this case, after the connection between the mobile terminal 10 and the control device 40 is established by Bluetooth in the above sequence, the control device 40 (for example, the ECU 40a) receives the music file of the mobile terminal 10. The control device 40 can output a reproduction signal based on the received audio file from the speaker 32R or can output the reproduction signal based on the received audio file from the speaker 32F through the amplifier 32. Alternatively, the audio file of the mobile terminal 10 may be reproduced by using the speaker in the vehicle. The control device 40 may receive the audio file of the radio broadcast acquired by the mobile terminal 10 using a radio-based application and output the received audio file from the speaker in the vehicle. The Bluetooth connection between the mobile terminal 10 and the control device 40 may be established by the distributed connection application, or may be established by making the user perform a manual operation according to the guide information display.

As described above, in the present embodiment, peripheral electronic devices can be easily and conveniently used by linking the charger with the peripheral electronic devices. According to the present embodiment, the screen of the electronic device enables the user to be notified that the mobile terminal can be charged by using the wireless charger in the vehicle, or that the mobile terminal can be linked with the electronic device in the vehicle. In the present embodiment, for example, when the user gets in the vehicle, the user is guided to place the mobile terminal on the wireless charger. In addition, in the present embodiment, when the mobile terminal is placed on the wireless charger, the sequence for linking between the mobile terminal and the electronic device is started. Therefore, it becomes easy for the user to notice that the electronic device can be linked with the mobile terminal. In addition, in the present embodiment, the operation to be performed by the user for the linking between the mobile terminal and the electronic device is displayed on the screen of the electronic device. Therefore, since the user easily understands the necessary operations, the degree to which the user uses the electronic device can be increased.

Modification Examples

The electronic device linking system according to the present embodiment is capable of appropriately linking other electronic devices without being limited to the video display device or the audio device. For example, as to the positioning of the steering wheel, the positioning of each seat, the air conditioning adjustment of the air conditioner, the color of the illumination in the car, the setting of the meter display on the front panel, the display setting of the navigation screen in the console, and the like, it is possible to adjust the settings to the user's preference by linking the electronic device, which controls these settings, with the mobile terminal of the user. The positioning of each seat includes the degree of reclining of each seat.

Figure 12:
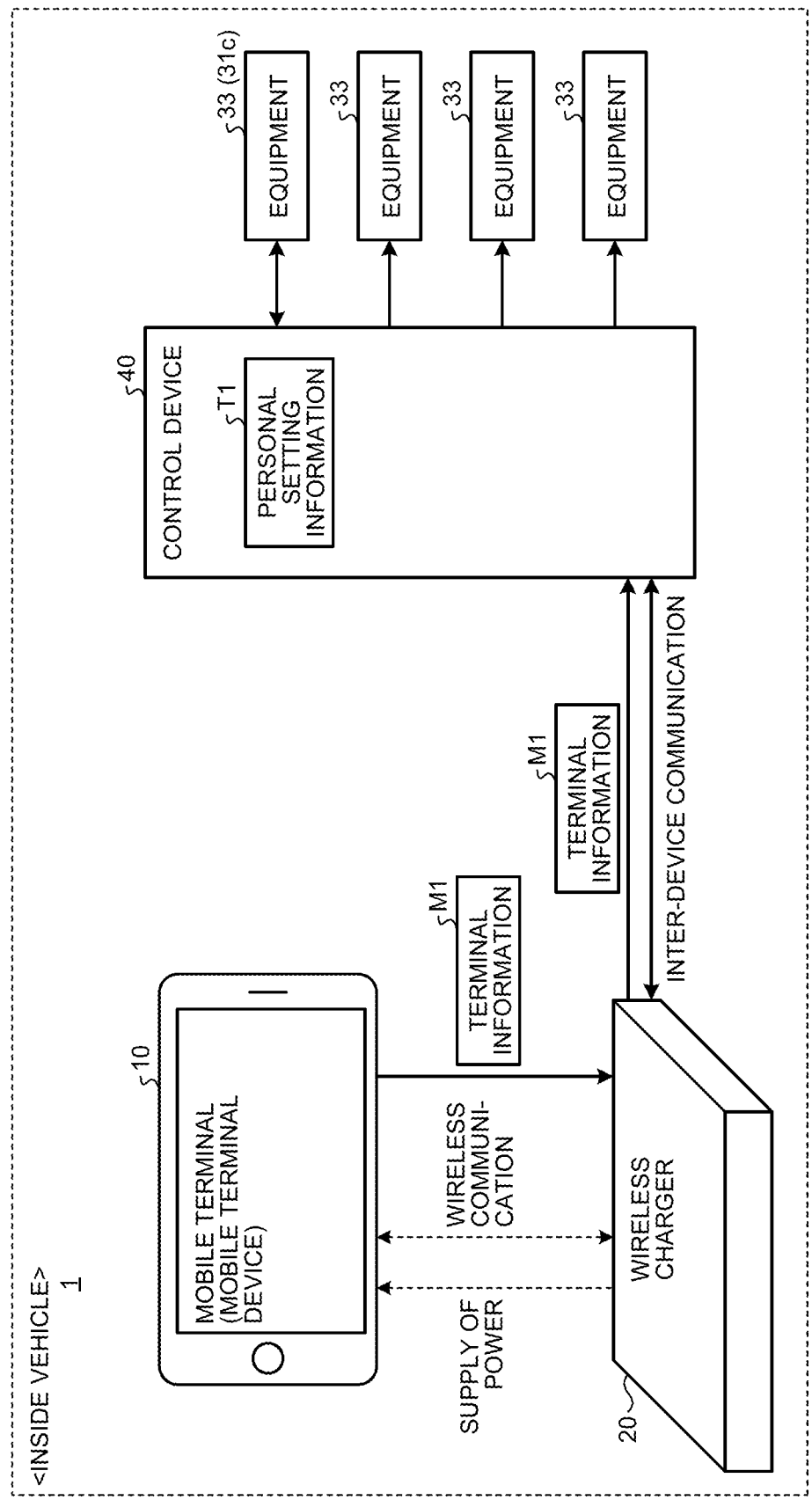
FIG. 12 is a diagram illustrating an example of the configuration of an electronic device linking system according to a modification example of the present embodiment.

FIG. 12 is a diagram illustrating an example of the configuration of an electronic device linking system according to a modification example of the embodiment described above. In addition, the same components as in the electronic device linking system of the foregoing embodiment are denoted by the same numbers, and the description thereof will be omitted as appropriate.

As illustrated in FIG. 12, an electronic device linking system 1 according to the modification example of the embodiment includes a mobile terminal 10, a wireless charger 20, pieces of equipment 33 being various in-vehicle devices, and a control device 40. Note that the pieces of equipment 33 each correspond to the electronic device 30 (FIG. 1). The pieces of equipment 33 are, for example, an air conditioner device in a vehicle, a control mechanism for the positioning of a steering wheel, a control mechanism for the positioning of each seat, and an illumination device in a vehicle. Here, the electronic device 30 to be controlled by the control device 40 is called equipment. A display device is also included in the equipment.

As illustrated in FIG. 12, in this modification example, the control device 40 stores personal setting information T1. The personal setting information T1 is the setting information of each piece of equipment 33 associated with the terminal information of the mobile terminal 10. For example, when the mobile terminal 10 is placed on the wireless charger 20, the terminal information of the mobile terminal 10 is transmitted from the wireless charger 20 to the control device 40. The control device 40 associates unique identification information included in the terminal information of the mobile terminal 10 with the settings of each piece of the equipment 33 made by the user at that time. The settings of the equipment 33 made by the user can be obtained, for example, by the control device 40 acquiring the set value from the control device that controls each piece of equipment 33.

In this modification example, the linking means that the mobile terminal 10 and the setting of each piece of the equipment 33 are linked through the wireless charger 20. In other words, in this modification example, it is not essential that the mobile terminal 10 and the equipment 33 perform linking, such as Miracast communication, through wireless communication. Needless to say, when a display device is included as equipment in this modification example, linking such as Miracast communication may be included. In this modification example, a piece of equipment 31c in the equipment 33 is a display device. Hereinafter, the piece of equipment 31c may be referred to as a display device 31c.

In this modification example, when the user places the mobile terminal 10 on the wireless charger 20, the wireless charger 20 transmits the terminal information M1 to the control device 40. The control device 40 reads out the personal setting information T1 stored in the memory and corresponding to the terminal information M1. The personal setting information T1 includes setting information corresponding to the terminal information M1 of each piece of equipment 33. The control device 40 sets each piece of equipment 33 on the basis of the personal setting information T1. At this time, the control device 40 may cause the display device 31c to display a check screen for checking whether or not to allow performing the setting of each piece of equipment 33 in the vehicle on the basis of the personal setting information T1. Then, in response to an input of consent to the check screen from the user by touch operation or the like, the control device 40 performs the setting of each equipment 33 on the basis of the personal setting information T1. In addition, when the user changes the settings of each piece of equipment 33 in the vehicle, the control device 40 may update the personal setting information T1. For example, the control device 40 may display a check screen as to whether or not to update the personal setting information T1 on the screen of the display device 31c. When an update instruction is received from the user on the check screen, the control device 40 may update the personal setting information T1. In addition, the personal setting information T1 may include information on settings of the equipment 33 that the user has performed in the past. The control device 40 may display a plurality of settings of each piece of equipment 33 on the screen of the display device 31c as a check screen to allow the user to select a favorite setting.

FIG. 13 is a diagram illustrating an example of a sequence for linking by the electronic device linking system 1 according to the modification example of the present embodiment. First, the wireless charger 20 receives the terminal information M1 of the mobile terminal 10 (S41) and transmits the terminal information M1 to the control device 40.

The control device 40 checks the personal setting information T by using the identification information of the terminal information M1 (S51), and outputs a check screen including the settings of each piece of equipment 33 corresponding to the identification information to the display device 31c (S52). The settings of each piece of equipment 33 may include a plurality of settings made in the past.

The display device 31c displays a check screen, receives a selection from the user by screen touch or the like, and outputs the received settings to the control device 40 (S61).

The control device 40 controls each piece of the equipment 33 with the selected settings (S53).

As described above, in the modification example of the embodiment, each piece of the equipment 33 in the vehicle is controlled in response to placing the mobile terminal 10 on the wireless charger 20 by the user. For example, by placing the mobile terminal 10 on the wireless charger 20, a check screen for the settings of each piece of equipment 33 is displayed on the display (31c), and each piece of equipment 33 is controlled after the check. As a result, each piece of equipment 33 in the vehicle can be easily set to the user's preference.

While the linking between the mobile terminal and the electronic device in the vehicle has been described in the above embodiment and modification example, the embodiment and the modification example may also be applied to electronic devices outside the vehicle. For example, peripheral equipment in a home or office may be linked with a mobile terminal. Peripheral equipment in a home or office is, for example, an air conditioner or a television.

According to the electronic device linking system according to the present disclosure, peripheral electronic devices can be easily and conveniently used by linking a charger with the peripheral electronic devices.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device linking system comprising:
one or more electronic devices;
a control device configured to control the electronic device; and
a wireless charger configured to charge a mobile terminal device, wherein
the wireless charger includes a first hardware processor configured to
receive terminal information of the mobile terminal device by wireless communication with the mobile terminal device, and
transmit, to the control device, the terminal information of the mobile terminal device received through the wireless communication, and
the control device includes a second hardware processor configured to link the mobile terminal device and the electronic device with each other on the basis of the terminal information received from the wireless charger.

2. The electronic device linking system according to claim 1, wherein
the one or more electronic devices include a display device, and
the second hardware processor is configured to
cause the display device to display a check screen for checking whether or not to allow performing a setting of the electronic device on the basis of personal setting information, the personal setting information being information about the setting of the electronic device and being associated with the terminal information, and
perform the setting of the electronic device on the basis of the personal setting information in response to receiving an input of consent to the check screen from a user.

3. The electronic device linking system according to claim 1, wherein
the one or more electronic devices include a display device,
the second hardware processor is configured to
display screen information on the display device,
perform wireless communication with the mobile terminal device, and
perform a setting for linking the display device and the mobile terminal device with each other on the basis of the terminal information, and,
after completing the setting for linking the display device and the mobile terminal device with each other, display, on the display device, information being displayed by the mobile terminal device.

4. The electronic device linking system according to claim 3, wherein
the second hardware processor is configured to
receive a screen operation on a display screen displayed by the display device, and,
upon receiving the screen operation, transmit an operation signal corresponding to the screen operation to the mobile terminal device by the wireless communication.

5. The electronic device linking system according to claim 3, wherein, when the mobile terminal device does not include an application for automatically performing a setting for connection with the control device, the second hardware processor displays, on the display device, guide information indicating a setting procedure for the setting for connection with the control device.

6. The electronic device linking system according to claim 3, wherein
the mobile terminal device includes an application for automatically performing a setting for connection with the control device, and
the second hardware processor automatically completes the setting for linking the display device and the mobile terminal device with each other through the wireless communication by causing the mobile terminal device to activate the application.

7. The electronic device linking system according to claim 3, wherein the setting for linking the electronic device and the mobile terminal device with each other, which is performed by the second hardware processor, includes a connection setting for the wireless communication between the mobile terminal device and the control device and includes a mirroring setting between the mobile terminal device and the control device.

8. The electronic device linking system according to claim 3, wherein,
when the mobile terminal device is in a fully charged state, the first hardware processor gives, to the control device, a notification that the mobile terminal device is in a fully charged state, and
the second hardware processor causes the display device to display a check screen for checking whether to continue or disconnect the linking between the mobile terminal device and the display device.

9. The electronic device linking system according to claim 3, wherein,
when it is detected that the mobile terminal device has been removed from the wireless charger, the first hardware processor gives, to the control device, a notification that the mobile terminal device has been removed, and
the second hardware processor causes the display device to display a check screen for checking whether to continue or disconnect the linking between the mobile terminal device and the display device.

10. The electronic device linking system according to claim 1, wherein
the electronic device is an audio device,
the second hardware processor is configured to
perform wireless communication with the mobile terminal device, and
perform a setting for linking the electronic device and the mobile terminal device with each other on the basis of the terminal information, and
cause the audio device to output audio information output from the mobile terminal device.

11. The electronic device linking system according to claim 1, wherein the wireless charger and the control device are provided in an automobile.

12. The electronic device linking system according to claim 11, wherein the one or more electronic devices include in-vehicle equipment.

13. A control device comprising:
a hardware processor configured to
communicate with a wireless charger, and
perform settings of one or more control targets on the basis of terminal information of a mobile terminal device transmitted from the wireless charger.

14. The control device according to claim 13, wherein
the one or more control targets include a display device, and
the hardware processor performs a setting for linking the mobile terminal device and the display device with each other on the basis of the terminal information of the mobile terminal device.

15. A method for linking a mobile terminal device and one or more electronic devices with each other, the method comprising:
   detecting a situation that the mobile terminal device has been placed on a wireless charger;
   receiving terminal information of the mobile terminal device through wireless communication with the mobile terminal device after detecting the situation that the mobile terminal device has been placed on the wireless charger;
   transmitting the terminal information to a control device controlling the electronic device; and
   performing a setting, by the control device, the electronic device on the basis of the terminal information.

* * * * *